United States Patent [19]

Walton

[11] Patent Number: 5,410,578
[45] Date of Patent: Apr. 25, 1995

[54] NUCLEAR PROPULSION ROCKET

[75] Inventor: Lewis A. Walton, Forest, Va.

[73] Assignee: The Babcock & Wilcox Company, New Orleans, La.

[21] Appl. No.: 946,699

[22] Filed: Sep. 18, 1992

[51] Int. Cl.⁶ .............................................. G21D 5/02
[52] U.S. Cl. ..................................... 376/318; 376/223; 376/423; 376/425; 376/427; 376/433; 376/447; 376/909
[58] Field of Search ............... 376/318, 223, 909, 427, 376/423, 425, 433, 447

[56] References Cited

U.S. PATENT DOCUMENTS

| | | | |
|---|---|---|---|
| 3,793,832 | 2/1974 | Moon | 60/203 |
| 4,017,567 | 4/1977 | Hrovat et al. | 264/0.5 |
| 4,060,454 | 11/1977 | Miertschin et al. | 176/84 |
| 4,076,775 | 2/1978 | Hackstein et al. | 264/0.5 |
| 4,113,563 | 9/1978 | Tobin | 176/84 |
| 4,246,751 | 1/1981 | Retallick | 60/203 |
| 4,569,820 | 2/1986 | Fortescue | 376/427 |

Primary Examiner—Daniel D. Wasil
Assistant Examiner—Chrisman D. Carroll
Attorney, Agent, or Firm—Robert J. Edwards; D. Neil LaHaye

[57] ABSTRACT

A nuclear propulsion reactor. A pressure vessel is provided with a reactor core that is surrounded by a radial reflector. Nuclear fuel elements in the core are formed from a hexagonal housing made from a high performance moderator and having a plurality of axial bores that extend the full length of the housing. A stack of nuclear fuel compacts having axial bores for coolant flow is received in the central axial bore of the housing. Hollow lithium hydride slugs are received in the bores at the corners of the housing. A rocket nozzle is attached to one end of the pressure vessel. Coolant/propellant flows into a passageway around the rocket nozzle for cooling thereof, upward through bores in the reflector and through the hexagonal housings of the fuel elements, downward through the bores in the nuclear fuel compacts and then out the rocket nozzle where propulsive thrust is produced.

10 Claims, 2 Drawing Sheets

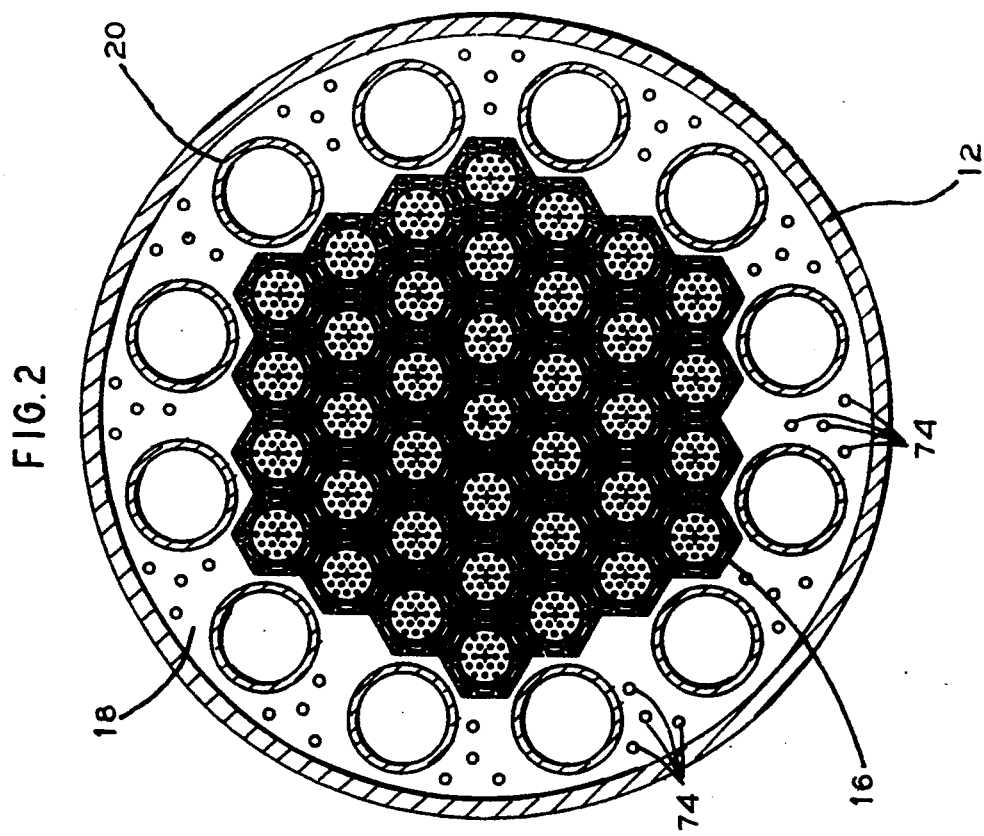
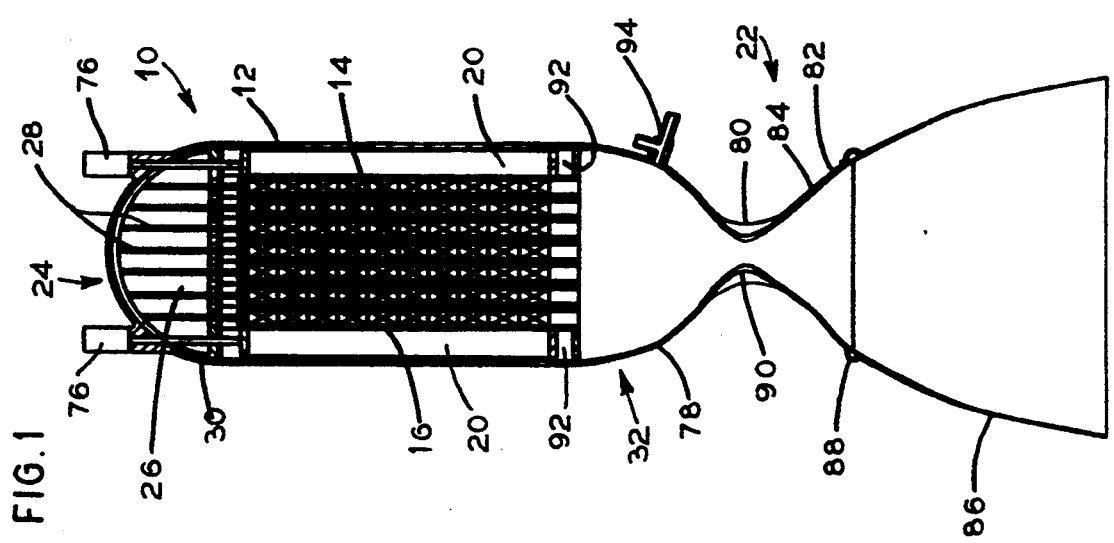

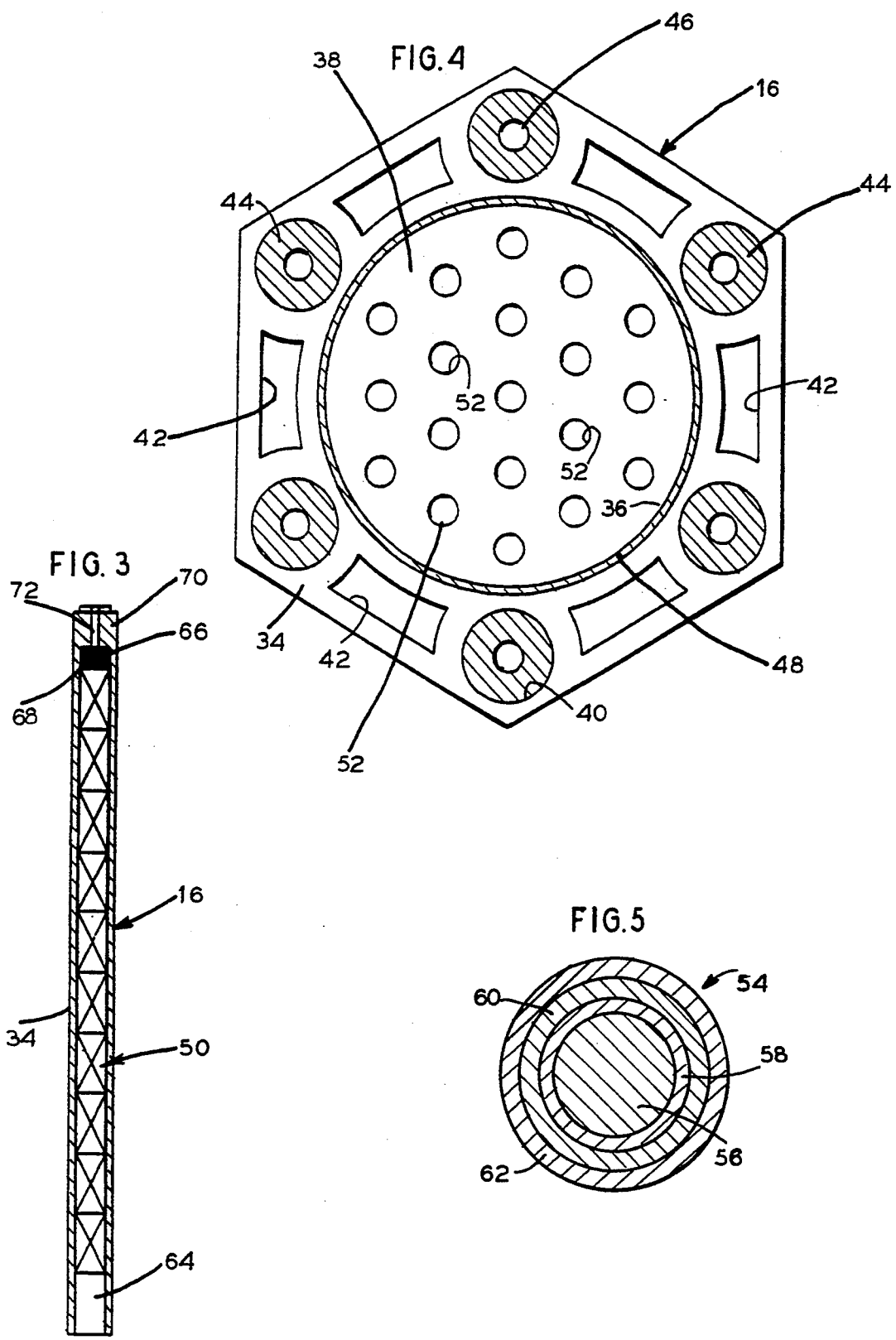

NUCLEAR PROPULSION ROCKET

BACKGROUND OF THE INVENTION

1. Field of the Invention

The present invention is generally related to nuclear reactors and, more particularly to nuclear propulsion reactors.

2. General Background

Nuclear rocket engines present an attractive choice for providing propulsive thrust because they have a much higher theoretical specific impulse than chemical rocket engines. Specific impulse is a measure of the fuel efficiency of a rocket engine. The very best chemical rocket engines have a specific impulse of approximately 450 seconds, meaning that they consume one pound of propellant every second for every 450 pounds of thrust they produce. The specific impulse of chemical rocket engines is limited to the low 100's of seconds range by the limited amount of chemical energy stored in the propellant. Since nuclear rocket engines utilize far more energetic nuclear processes to heat the propellant, they are not limited by the same considerations as chemical rocket engines. The theoretical specific impulse of various nuclear rocket engine concepts ranges from a low of approximately 750 seconds to values greater than 10,000 seconds.

Nuclear rocket concepts can generally be grouped into the categories of nuclear thermal rockets and nuclear electric rockets. Nuclear thermal rockets utilize the heat generated in the nuclear reactor core to directly heat a propellant that is then expelled through a nozzle to produce thrust. Solid core nuclear thermal rockets, such as the ROVER-NERVA rockets and their ENABLER-I and ENABLER-II derivative designs, are particularly prone to high engine weight and low thrust-to-weight ratios due to their use of a high-temperature carbon-based reactor core. Carbon is a poor neutron moderator. This results in an epithermal neutron spectrum in the core and large critical masses. Materials having moderator characteristics superior to carbon generally have a much lower allowable operating temperature and can not tolerate the high temperatures present in a nuclear rocket engine. These characteristics make it particularly difficult to design a small nuclear rocket utilizing ROVER-NERVA technology. Patent applications directed to nuclear rockets which applicant is aware of include the following.

Copending U.S. application assigned Ser. No. 07/895,054 discloses a two stage nuclear propulsion reactor. An annular first core radially encompasses a second core to provide two stage heating of the propellant as it is directed through the reactor.

Copending U.S. application assigned Ser. No. 07/822,391 discloses a thermionic reactor that provides electrical and propulsion power. Thermionic heat pipe modules located within the reactor vessel convert heat into useful electrical energy and serve to remove waste heat. Coolant/propellant travels through the reactor vessel and is directed to a propellant nozzle for producing propulsive thrust.

The known art is not directed to the problems associated with the utilization of a high performance moderator in combination with a high-temperature carbon based reactor core.

SUMMARY OF THE INVENTION

The present invention addresses the above problems. What is provided is a nuclear propulsion rocket that utilizes a high performance moderator and a structural arrangement that isolates the hot carbon-based fuel from the rest of the reactor core. A pressure vessel containing the reactor core is attached to a rocket nozzle. The reactor core is surrounded by a radial reflector. Each fuel element in the core is formed by a hexagonal beryllium housing surrounding a stack of cylindrical fuel compacts. Hollow lithium hydride slugs are stacked in holes bored through the full length of each corner of the beryllium housings. The combination of beryllium and lithium hydride serves as a very efficient moderator. An insulator sleeve between the fuel compacts and the beryllium housing limits the conduction of heat from the nuclear fuel into the moderator. Cryogenic hydrogen propellant is passed axially through coolant passages in the beryllium housing and through a central bore in each of the lithium hydride slug columns to remove any heat that is conducted out of the fuel through the insulator sleeve and to remove heat that is generated during the neutron moderation process. Propellant also flows axially through passages in the fuel compacts. Propellant flows from a passage around the rocket nozzle into the end of the pressure vessel adjacent the rocket nozzle, through the passages in the moderator into a plenum at the opposite end of the pressure vessel, through the passages in the fuel compacts, and then to the rocket nozzle where it produces propulsive thrust as it exits the nozzle.

BRIEF DESCRIPTION OF THE DRAWINGS

For a further understanding of the nature and objects of the present invention reference should be had to the following description, taken in conjunction with the accompanying drawings, in which like parts are given like reference numerals, and wherein:

FIG. 1 is a longitudinal cross sectional view of the invention.

FIG. 2 is a lateral cross sectional view of the invention at the reactor core mid-plane.

FIG. 3 is a longitudinal cross section view through one of the fuel elements of the invention.

FIG. 4 is a lateral cross section view through one of the fuel elements at the reactor core mid-plane.

FIG. 5 is a cross section view through an individual spherical fuel particle of the invention.

DETAILED DESCRIPTION OF THE PREFERRED EMBODIMENT

Referring to the drawings, it is seen in FIGS. 1 and 2 that the invention is generally indicated by the numeral 10. Nuclear propulsion rocket 10 is generally comprised of pressure vessel 12, reactor core 14, a plurality of nuclear fuel elements 16, radial reflector 18, control drums 20, and rocket nozzle 22.

Pressure vessel 12 is formed in a manner known in the art from material suitable for use with nuclear materials. Pressure vessel 12 has a forward or first end 24 that contains an internal shield 26 to protect equipment associated with nuclear propulsion rocket 10 from radiation. Flow passages 28 are provided in internal shield 26 for coolant/propellant. Plenum 30 is provided between internal shield 26 and pressure vessel 12 and is in fluid communication with flow passages 28. The rearward or second end 32 of pressure vessel 12 forms part of rocket nozzle 22 and will be more fully explained below.

Reactor core 14, seen in FIGS. 1 and 2, is positioned in pressure vessel 12 and is comprised of a plurality of nuclear fuel elements 16. Each nuclear fuel element 16, best seen in FIGS. 3 and 4, is comprised of a hexagonal housing 34 that is formed from a high performance moderator such as beryllium. Each hexagonal housing 34 has a plurality of bores that extend along the full length of housing 34. Central axial bore 36 receives nuclear fuel 38. Circular bores 40 are positioned at each of the six corners of hexagonal housing 34. Bores 42 are positioned between bores 40 and may be of any suitable cross section shape. Each circular bore 40 preferably receives a stack of a plurality of hollow lithium hydride slugs 44. The central axial bore 46 in the lithium hydride slugs 44 and bores 42 serve as passages for the flow of coolant/propellant. Insulator sleeve 48 is received in central axial bore 36 around nuclear fuel 38. Insulator sleeve 48 is formed from a suitable insulation material such as reticulated vitreous carbon foam coated with niobium carbide to resist erosion by hot hydrogen. The insulator sleeve 48 limits the conduction of heat from the nuclear fuel into the relatively low melt point materials of the moderator used to form hexagonal housing 34. Lithium hydride slugs 44 are preferably made from lithium enriched to four nines purity in the lithium-7 isotope and coated on all exterior and interior surfaces with beryllium. Nuclear fuel 38 is comprised of a plurality of right circular cylinders 50 (seen in FIG. 3) made from compacted carbon and having a plurality of axial bores 52 that serve as flow passages for coolant/propellant. Cylinders 50 are preferably coated on all exterior and interior free surfaces with niobium carbide to prevent erosion by the hot propellant. Laminated spherical fuel particles 54, seen in FIG. 5, are embedded in the carbon matrix of cylinders 50 during the fabrication process. Each fuel particle 54 is comprised of a spherical kernel 56 made from uranium carbide that is highly enriched in the fissile uranium-235 isotope to enable a critical mass to be assembled in a very compact space.

Kernel 56 is coated with a porous carbon buffer layer 58, then a dense carbon sealant coating 60, and then a coating 62 of niobium carbide. The coatings are applied using chemical vapor deposition in a manner known in the art. Porous layer 58 mechanically isolates sealant coating 60 from the thermal expansion of kernel 56 during operation and also provides a reservoir to contain the fission products. Sealant coating 60 serves to contain the highly radioactive fission products generated in kernel 56 during the neutronic reaction and prevents their release to the surrounding environment. Coating 62 serves as an additional seal to contain fission products and acts as a protecting layer if the fuel particle 54 should come into contact with hot propellant. As seen in FIG. 3, cylinders 50 are stacked inside hexagonal housing 34. Fuel element lower nozzle 64 is a right circular cylinder of the same dimensions as a cylinder 50 and is provided with flow passages identical in diameter and configuration to axial bores 52 to allow the hot propellant to exit fuel elements 16 and travel to rocket nozzle 22. Lower nozzle 64 is preferably formed from beryllium carbide to withstand the high coolant/propellant temperatures and coated on all external and internal surfaces with niobium carbide to resist erosion. The array of beryllium carbide lower nozzles across this portion of reactor core 14 serves as a reflector. A plurality of spring washers 66 are provided adjacent the upper end of each fuel element 16 to accommodate differential thermal expansion between the hot fuel column and the cold beryllium housing 34. Spring washers 66 are pretensioned during assembly between insulator disk 68 and fuel element upper nozzle 70 to maintain a preload on the fuel column to prevent engine vibrations from damaging the fuel. The spring load also helps to maintain alignment of cylinders 50 and axial bores 52 therein. Insulator disk 68 limits heat conduction to upper nozzle 70, which is preferably formed from beryllium. Upper nozzle 70 is provided with a central flow passage 72 for coolant/propellant. The array of beryllium upper nozzles 70 across reactor core 14 serves as a reflector for that portion of core 14.

Radial reflector 18, seen in FIG. 2, is preferably formed from beryllium and is positioned between pressure vessel 12 and reactor core 14. A plurality of flow passages 74 are provided that extend through the entire length of radial reflector 18 to allow passage of coolant/propellant therethrough. A plurality of control drums 20 that extend the length of reactor core 14 are received within the area of radial reflector 18 and spaced around reactor core 14 for control thereof. In a manner known in the art, control drums 20 are coated on one side with a neutron poison such as gadolinium. Control drums 20 are used to control neutronic activity by rotation of the drums such that the neutron poison faces toward or away from reactor core 14. Rotation of control drums 20 is accomplished by motors 76 that are operatively engaged therewith.

Rocket nozzle 22 is comprised of a converging section 78, nozzle throat 80, and diverging section 82. As indicated above, converging section 78 is formed by the lower or second end 32 of pressure vessel 12. As seen in FIG. 1, converging section 78 is tapered inwardly to form nozzle throat 80. Nozzle throat 80 then tapers outwardly away from pressure vessel 12 to form diverging section 82. Diverging section 82 is comprised of forward section 84 and aft section 86. Forward section 84 is formed from metal and is regeneratively cooled by coolant/propellant that enters nozzle torus 88 to prevent it from being melted by the high operating temperatures of the engine. Aft section 86 is not subjected to the same temperature extremes and may be made from a carbon fiber material since it does not require dynamic cooling. Coolant/propellant received in nozzle torus 88 flows through passageway 90 in the walls of rocket nozzle 22.

During operation, coolant/propellant, preferably cryogenic hydrogen, from a source not shown flows into nozzle torus 88 and through passageway 90 along the sides of converging section 78, cooling rocket nozzle 22 in the process, and then into pressure vessel 12 at inlet plenum 92. Inlet plenum 92 directs the coolant/propellant into flow passages 74 for axial flow upward through radial reflector 18 and for upward flow through bores 42, 44 in hexagonal housings 34 for cooling of the radial reflector, control drums 20, and other associated equipment. The coolant/propellant exits from these passages into plenum 30. Plenum 30 directs the coolant/propellant around internal shield 26 and into flow passages 28 that are in fluid communication with central flow passages 72 in the upper nozzles of fuel elements 16. The coolant/propellant then travels axially through axial bores 52 in the nuclear fuel and out lower nozzles 64 into converging section 78 of rocket nozzle 22. The heated propellant then travels through nozzle throat 80 where it produces propulsive thrust as it expands and enters diverging section 82. Mixing valve 94 may be used to extract hot propellant from converging section 78 and in a manner known in the art mix it with unheated coolant/propellant to provide warm gas to drive a turbo pump not shown that provides pressurized coolant/propellant to the engine. It should be understood that nuclear propulsion rocket 10 is intended to be used to propel a vehicle such as a working satellite into orbit and such equipment is not shown for ease of illustration.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A nuclear propulsion rocket, comprising:
   a. a pressure vessel;
   b. a reactor core in said pressure vessel having a plurality of nuclear fuel elements wherein each nuclear fuel element comprises:
      i. a hexagonal housing formed from moderator material and having a plurality of axial bores, including a central axial bore, along the full length of said housing;
      ii. nuclear fuel received in the central axial bore of said hexagonal housing;
      iii. insulation material received in the central axial bore of said hexagonal housing around said nuclear fuel; and
      iv. a plurality of hollow lithium hydride slugs stacked in one or more but less than all of the axial bores in said hexagonal housing;
   c. a radial reflector between said pressure vessel and said reactor core; and
   d. a rocket nozzle in fluid communication with the interior of said pressure vessel.

2. The nuclear propulsion reactor of claim 1, further comprising a control drum received in said radial reflector.

3. The nuclear propulsion reactor of claim 1, wherein said nuclear fuel is provided with a plurality of axial bores along the full length of said fuel.

4. The nuclear propulsion reactor of claim 1, further comprising an upper and lower nozzle formed from reflector material in each of said hexagonal housings.

5. The nuclear propulsion reactor of claim 1, further comprising a flow passageway for coolant around said rocket nozzle.

6. The nuclear propulsion reactor of claim 1, wherein said radial reflector is formed from beryllium.

7. A nuclear propulsion rocket, comprising:
   a. a pressure vessel;
   b. a reactor core in said pressure vessel having a plurality of nuclear fuel elements wherein each nuclear fuel element comprises:
      i. a hexagonal housing formed from moderator material and having a plurality of axial bores, including a central axial bore, along the full length of said housing;
      ii. nuclear fuel having a plurality of axial bores along the full length of said fuel and received in the central axial bore of said hexagonal housing;
      iii. insulation material received in the central axial bore of said hexagonal housing around said nuclear fuel; and
      iv. a plurality of hollow lithium hydride slugs stacked in one or more but less than all of the axial bores in said hexagonal housing;
   c. a radial reflector between said pressure vessel and said reactor core;
   d. a control drum received in said radial reflector; and
   e. a rocket nozzle in fluid communication with the interior of said pressure vessel.

8. The nuclear propulsion reactor of claim 7, further comprising an upper and lower nozzle formed from reflector material in each of said hexagonal housings.

9. The nuclear propulsion reactor of claim 7, further comprising a flow passageway for coolant around said rocket nozzle.

10. The nuclear propulsion reactor of claim 7, wherein said radial reflector is formed from beryllium.

* * * * *